United States Patent [19]

Steele

[11] Patent Number: 4,949,372
[45] Date of Patent: Aug. 14, 1990

[54] REMOTE ACTUATED COMMAND CIRCUIT FOR SEIZING TELEPHONE LINES

[75] Inventor: David C. Steele, Granite Falls, N.C.

[73] Assignee: Moose Products, Inc., Hickory, N.C.

[21] Appl. No.: 269,636

[22] Filed: Nov. 9, 1988

[51] Int. Cl.⁵ .......................................... H04M 11/04
[52] U.S. Cl. ...................................... 379/46; 379/49; 379/102; 379/74; 379/106
[58] Field of Search ............................ 379/46, 48–50, 379/102, 106–107, 37, 39, 74, 97, 104, 105

[56] References Cited

U.S. PATENT DOCUMENTS

| | | | |
|---|---|---|---|
| 4,085,292 | 4/1978 | Leslar et al. | 379/46 |
| 4,119,810 | 10/1978 | Marin et al. | 379/40 |
| 4,394,540 | 7/1983 | Willis et al. | 379/104 |
| 4,549,045 | 10/1985 | Castro et al. | 379/82 |
| 4,584,434 | 4/1986 | Hashimoto | 379/100 |
| 4,660,218 | 4/1987 | Hashimoto | 379/102 |
| 4,741,022 | 4/1988 | Chebra et al. | 379/39 |
| 4,791,658 | 12/1988 | Simon et al. | 379/104 |
| 4,794,637 | 12/1988 | Hashimoto | 379/100 |

FOREIGN PATENT DOCUMENTS

| | | | |
|---|---|---|---|
| 0205401 | 12/1986 | European Pat. Off. | 379/37 |
| 0143975 | 9/1982 | Japan | 379/97 |
| 0281655 | 12/1987 | Japan | 379/100 |

OTHER PUBLICATIONS

R. A. Broomfield et al., "Making a Data Terminal Out of a Touch-Tone Telephone", *Electronics*, Jul. 3, 1980, pp. 124–129.

*Primary Examiner*—Jin F. Ng
*Assistant Examiner*—Wing F. Chan
*Attorney, Agent, or Firm*—Bell, Seltzer, Park & Gibson

[57] ABSTRACT

A remote actuated command circuit establishes telephone communications between a communications device at a remote location and a local communications terminal device without interference from a telephone answering machine connected to the incoming telephone line. The remote actuated command circuit establishes these communications when it receives from the remote communications device a predetermined signal not normally available to a telephone user.

25 Claims, 2 Drawing Sheets

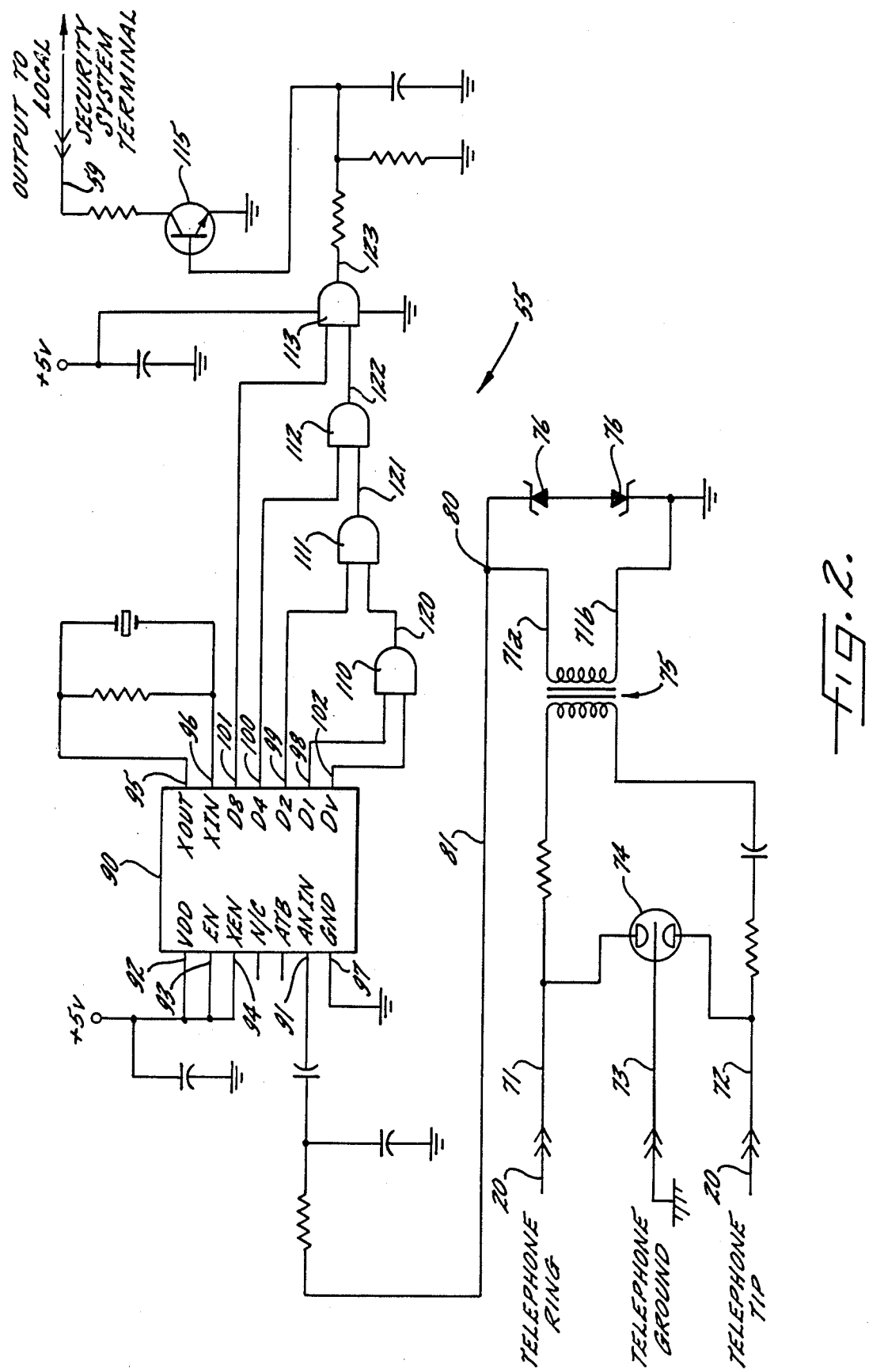

REMOTE ACTUATED COMMAND CIRCUIT FOR SEIZING TELEPHONE LINES

FIELD AND BACKGROUND OF THE INVENTION

This invention relates generally to establishing telephone communications between a remote communications device and a local communications terminal. The invention is especially applicable for telephone communications between a central security monitoring facility at a remote location and a local security system terminal.

Many homes are now equipped with a local security system terminal which is capable of communicating with a central security monitoring facility over the telephone lines. In a typical operation, when an alarm condition occurs, a module in the local security system dials the telephone number of the central security monitoring facility, and generates an alarm in the computer of the central security monitoring facility, so that the central security monitoring facility can call the police, fire department, etc. for the owner. Many of the local security system terminals are also capable of receiving a telephone call from the central security monitoring facility for the purpose of checking on the status of the local security system terminal or sending control information to the local security system terminal. For this purpose, the local security system terminal is equipped with a ring answer circuit which is set to answer a telephone call after a certain number of rings (generally six to fifteen rings).

A problem has been presented for this security arrangement by the increased use of telephone answering machines. Typically these machines are set to answer the telephone after two to five rings. Thus, if the central security monitoring facility tries to call the local security system terminal, the telephone answering machine will answer before the telephone rings a sufficient number of times for the ring answer circuit of the local security system terminal to answer. Consequently, the telephone answering machine prevents the central security monitoring facility from gaining access to the local security system terminal.

The present invention solves this problem by providing a remote actuated command circuit which is designed to monitor the telephone line and to allow the central security monitoring facility to override and bypass the telephone answering machine. In particular, when the monitoring facility is calling and the telephone answering machine answers, a predetermined signal is sent from the monitoring facility onto the telephone line. This predetermined signal is sensed by the remote actuated command circuit, and the local security system terminal is thereupon connected to the telephone line so that the remote monitoring facility has seized the telephone line for data exchange or device control purposes without interference from the telephone answering machine.

In order to maintain tight controls on remote access to local security system terminals, the remote actuated command circuit of the present invention detects a predetermined signal which is not available to an ordinary telephone user. In a preferred embodiment, the remote actuated command circuit detects one or more of the four dual tone multi-frequency ("DTMF") tones that are not provided on a typical telephone keypad. Once detected, an output signal can be generated for overriding automatic telephone answering equipment and seizing the telephone line to establish communication between the remote monitoring facility and local security system terminal. The DTMF tones that are used in touchtone telephones include sixteen (16) tones. The normal telephone keypad uses only twelve of these sixteen tones. The unused tones have traditionally been utilized and reserved for routing a call through telephone switches. In other words, these tones are normally used only by the various telephone switching offices that cause a connection to be established between the calling and called parties and are not used once a connection has been established.

It is known to provide a telephone device with remote access capability through the use of predetermined codes or tones transmitted on the telephone line. One example includes the "beeperless remote" telephone answering machines. These devices enable an owner of a machine to call his home from a remote location and send a specific tone (e.g. press the "2" touchtone button on his telephone keypad) once the call has been established. This allows the owner to replay the messages that have been recorded, turn the answering machine off, reset the tape position where the next message is to be recorded, etc. Another example of a device actuated remotely by sensing predetermined codes or tones on the telephone line is disclosed in U.S. Pat. No. 4,584,434, where an answering machine is used to instruct a calling party to press a certain touchtone button if direct connection to a telecopier is needed.

These devices require that the code or tones be accessible to the ordinary telephone user—they use the twelve DTMF tones available on the normal telephone keypad. This approach is totally unsuitable for a security system where for security purposes it is essential to prevent unauthorized access to the local security system terminal.

With the foregoing in mind, it is a primary object of the present invention to provide a remote actuated command circuit which establishes telephone communications between a communications device at a remote location and a local communications terminal device without interference from a telephone answering machine connected to an incoming telephone line.

It is a further and more specific object of the present invention to provide a remote actuated command circuit which establishes these communications when it receives from the remote communications device a predetermined signal not normally available to a telephone user.

SUMMARY OF THE INVENTION

These and other object and advantages of the present invention are achieved by the remote actuated command circuit apparatus and method hereinafter more fully described.

The present invention, in one aspect, provides a method of establishing telephone communications between a central security monitoring facility at a remote location and a local security system terminal without interference from a telephone answering machine connected to an incoming telephone line of a local telephone system. The method comprises establishing a telephone connection from the central security monitoring facility to the incoming telephone line of the local telephone system. The central security monitoring facility transmits to the incoming telephone line of the local telephone system a predetermined signal not normally available to a telephone user. The predetermined signal is monitored for on the incoming telephone line, and, in response to receipt of the predetermined signal, the telephone answering machine is overridden and the local security system terminal is connected to the incoming telephone line. This establishes telephone communications from the central security monitoring facility to the local security system terminal without interference presented by the connection of the telephone answering machine to the incoming telephone line.

While the method of the present invention is particularly useful for establishing telephone communications between a central security monitoring facility and a local security system terminal, persons skilled in the art will appreciate that the method and related circuit are also quite useful in many other specific applications where it is necessary to establish telephone communications between a communications device at a remote location and a local communications terminal device without interference from a telephone answering machine connected to the local telephone system.

In accordance with another aspect of the present invention, a remote actuated command circuit is provided which is used in a telephone system which comprises an incoming telephone line with at least one telephone device adapted to communicate over it. A local communications terminal device is provided for communicating over the incoming telephone line with a communications device at a remote location. In order to seize the incoming telephone line to permit establishing communications between both the remote communications device and the local communications terminal device without interference presented by the connection of a telephone answering machine, the remote actuated command circuit controls a relay which is switchable between a first position connecting the telephone line to at least one telephone device and a second position for seizing the telephone line and connecting the local communications terminal device to the telephone line. This telephone line is monitored for a predetermined signal which comprises at least one of the dual tone multi-frequency tones not available on a normal telephone keypad. In response to detection of the predetermined signal, the relay is switched from the first position to the second position so that communications can be established between the remote communications device and the local communications terminal device.

BRIEF DESCRIPTION OF THE DRAWINGS

Some of the features and advantages of the invention having been stated, others will appear as the description proceeds, when taken in connection with the accompanying drawings, in which:

FIG. 2 is a schematic circuit diagram of the electrical circuit for the remote actuated command circuit in accordance with the present invention.

DETAILED DESCRIPTION OF THE INVENTION

Figure 1:
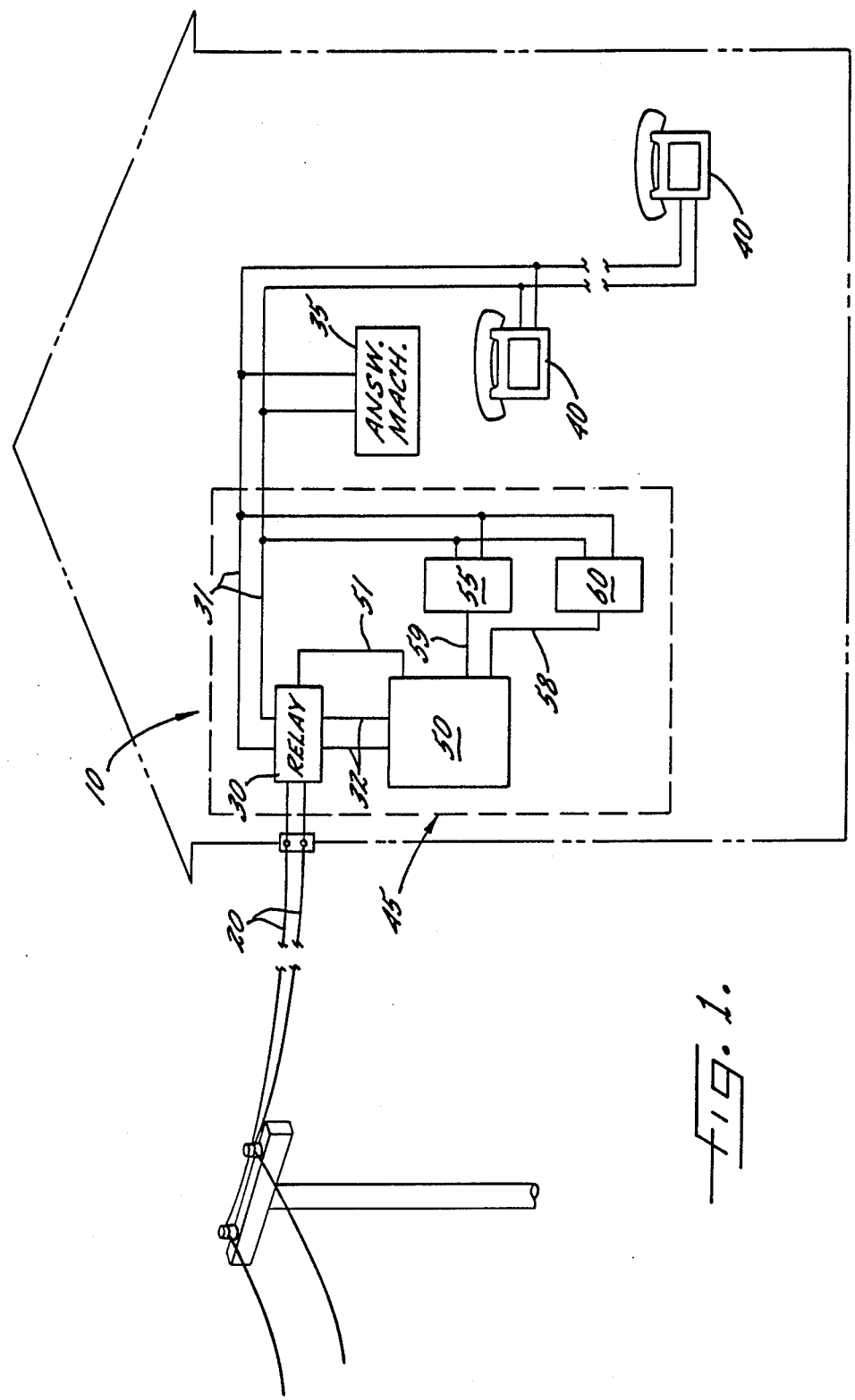
FIG. 1 is a block schematic diagram illustrating a house which is equipped with a security system terminal, and with a remote actuated command circuit for overriding a telephone answering machine.

While the present invention will be described hereinafter with particular reference to the accompanying drawings, it is to be understood at the outset of this description that persons skilled in the applicable arts will be able to modify the specific arrangements here described and shown while continuing to achieve the desired result of this invention. Accordingly, the description and illustrations are to be taken as broad, teaching disclosures directed to persons skilled in the appropriate arts, and not as restricting the scope of the present invention. For example, while the following detailed description discusses and illustrates a security system in the context of a burglar/fire alarm system, it will be readily understood by persons skilled in the art how to use this invention with other types of environments where there are devices for causing a ringing telephone line to go off-hook.

FIG. 1 illustrates a typical home installation of a security system 10 which has access to a telephone line for sending and receiving information to or from a central security monitoring facility at a remote location. As shown, an incoming telephone line 20 is connected inside a house to a telephone seize relay 30. A telephone line 31 is connected to the seize relay 30 for providing telephone communications service to all the telephone devices in the house. Thus, for example, in the illustrated arrangement, conventional telephone sets 40 and a telephone answering machine 35 are connected to the telephone line 31.

The major components of the security system include the telephone seize relay 30, a local security system terminal 50, a ring answer circuit 60, and a remote actuated command circuit 55. These components are normally positioned in a security box 45. The local security system terminal 50 may be of the type conventionally used in burglar/fire alarm systems. Suitable local terminals are available commercially, for example, from Moose Products Company of Hickory, North Carolina. The local security system terminal 50 is typically connected to various monitoring devices and/or sensors, such as door and window sensors, magnetic switches, motion detectors, pressure pads, and smoke/fire detectors.

The local security system terminal 50 is designed to communicate over the telephone line 20 with a central security monitoring facility at a remote location. Thus, for example, when a burglar or fire alarm condition occurs, an outward dialing circuit provided in the local security system terminal 50 will place a telephone call to the central security monitoring facility and will transmit data to the central monitoring facility concerning the alarm condition which has occurred.

Under normal conditions, the telephone seize relay 30 connects the incoming telephone line 20 with the telephone line 31 within the house so that the telephone devices in the house can be used in the normal manner. However, when an alarm condition occurs, the telephone seize relay 30 seizes the telephone line 20 and connects the local security system terminal 50 exclusively to the incoming telephone line 20. Thus, as is illustrated in FIG. 1, the seize relay 30 is switched from its normal position in which the telephone line 31 is connected to the incoming telephone line 20 to an alarm position in which the incoming telephone line 20 is connected via telephone line 32 directly and exclusively to the security system terminal 50. A microprocessor in the local security system terminal 50 places an appropriate signal on line 51 once the alarm condition is detected so that input can be provided to the seize relay 3 for effecting switching of the relay 30 from its normal position to its alarm position.

The local security system terminal 50 is also capable of receiving a telephone call from a central security monitoring facility for the purpose of checking on the status of the local security system terminal 50 or for the purpose of sending control information to the local security system terminal 50. For this purpose, the system 10 is provided with a ring answer circuit 60 which is typically set to answer a telephone call after a certain number of rings—usually from 6 to 15 rings. In answering, the ring answer circuit 60 places an appropriate signal on line 58 to the microprocessor of local security system 50 for causing the seize relay 30 to switch from telephone line 31 to telephone line 32, as before. In the burglar/fire alarm industry, this is known as "Uploading and Downloading." Features which can be remotely controlled in this particular manner include checking the status of the local terminal, reading whether a zone has been violated, arming and disarming the system, reprogramming the system so that a particular zone can be overridden, etc. The uploading and/or downloading of information can be initiated by central security monitoring facility quite easily by a computer system of the central monitoring facility placing a telephone call to the telephone line of the local business or residence at a time when the occupants are not available to answer.

However, when a telephone answering machine 35 is installed, the automatic answering function of the answering machine 35 interferes with the operation of the ring answer circuit 60 since there is no assurance that a call from the central monitoring facility will result in a connection with the security system terminal 50. Typically, telephone answering machines are set to answer the telephone after two to five rings. Thus, if the central security monitoring facility tries to call the local security system terminal 50, the telephone answering machine 35 may answer before the telephone rings a sufficient number of times for the local security system terminal 50 to answer through the ring answer circuit 60. As a result, the telephone answering machine 35 prevents the central security monitoring facility from gaining access to the local security system terminal 50.

The remote actuated command circuit 55 solves this problem by continuously monitoring the telephone line 20 and allowing the central security monitoring facility, or any other communications device at a remote location for that matter, to override and bypass the telephone answering machine 35. In particular, when the central security monitoring facility is calling and the telephone answering machine 35 answers, a predetermined signal is sent from the central security monitoring facility onto the telephone line 20. This predetermined signal is sensed by the remote actuated command circuit 55, and a signal is generated and placed on line 59 to the microprocessor of the local security system terminal 50. Upon receipt of this signal, the microprocessor through line 51 causes the seize relay 30 to switch from its normal telephone line 31 (which has the telephone line 20 connected to the telephone answering machine 35 and telephone sets 40) to its second or alarm telephone line 32. This seizes the incoming telephone line 20 and connects the local security system terminal 50 to the telephone line 20. Consequently, the local security system terminal 50 is connected exclusively to the telephone line 20 so that the central security monitoring facility has seized the telephone line 20 for data exchange or device control purposes without interference from the telephone answering machine 35.

In order to maintain secure controls over remote access to a local security system terminal 50, the remote actuated command circuit 55 of the present invention detects a predetermined signal which is not available to an ordinary telephone user. In a preferred embodiment, the remote actuated command circuit 55 detects one or more of the four dual tone multi-frequency ("DTMF") tones that are not provided on a typical telephone keypad. These DTMF tones that are used with touchtone telephones include sixteen (16) tones. The normal telephone keypad uses only twelve of these sixteen tones. Thus, there are four unused tones, labeled "A", "B", "C", and "D." These unused tones have traditionally been utilized and reserved for routing a call through telephone switches. In other words, these tones were only used by the various telephone switching offices that cause a connection to be established between the calling and called parties and are not used once a connection has been established. More specifically, the "A" tone comprises the simultaneous 697 Hertz and 1633 Hertz, the "B" tone comprises the simultaneous 770 Hertz and 1633 Hertz, "C" tone comprises the simultaneous 852 Hertz and 1633 Hertz, and "D" tone comprises the simultaneous 941 Hertz and 1633 Hertz.

This invention is not limited to only the unused DTMF tones, but also may utilize other tones which are not available to an ordinary telephone user. For example, a standard modem signal, a pulsing single tone, a unique single tone for a duration of time, step single tones, or any other signal which is not available to an ordinary telephone user can be employed. This predetermined signal not normally available to a telephone user can be in series at least one other standard user available tone as is present on the normal twelve button telephone keypad.

Additionally, it should be noted that a telephone answering machine 35 is not required in order to allow the remote actuated command circuit 55 to operate. An example would be when the central security monitoring facility has called and a telephone set 40 answers to establish the call. At this time, the central security monitoring station can transmit the predetermined signal for the remote actuated command circuit 55 to detect and ultimately cause the seize relay 30 to switch from the first telephone line 31 to the second telephone line 32. As before, this seizes the telephone line 20 so that the telephone set 40 has been overridden and the local security system terminal 50 is connected to the telephone line 20.

Referring now more particularly to FIG. 2, the operative components of the remote actuated command circuit 55 of the present invention are shown in the schematic circuit diagram. FIG. 2 shows the remote actuated command circuit 55 with the telephone line 20 inputted to it. As stated before, this is where the predetermined signal is sensed. Specifically, a line designated telephone "ring" 71, a line designated for telephone "tip" 72, and a line designated telephone "ground" 73 are all connected to a transient surge protector 74. This transient surge protector 74 protects the remote actuated command circuit 55 from spikes of current or voltage that could potentially damage and disrupt the operation. Lines 71 and 72, respectively, continue on from the transient surge protector 74 to a primary side of a transformer 75 while lines 71a and line 72a, respectively, are connected to the secondary side of the transformer 75. Line 72a is connected to ground and also is connected to a pair of back-to-back zener diodes 76 so that it ultimately is coupled with line 71a at junction 80. A single line 81 is formed there for being connected to the commercially available DTMF decoder circuit 90, such as the CD2204 chip.

This circuit 90 is designed to decode the DTMF tones sensed on line 81 and to generate a corresponding binary signal on its output lines. The outputted binary signals are then processed by appropriate logic circuits to signal the microprocessor that seize relay 30 needs to seize the telephone line 20 if correct tones are detected. Communications can be established between the central monitoring facility the local security system terminal 50.

In the specific this has been illustrated with one of the un tones, namely the "C" tone. While it is explained with the "C" tone, one skilled in the art can to verify other tones or codes. Particularly, it is in the art to implement various logic gates, such as OR, EXCLUSIVE OR, etc. This allows for signalling appropriate binary high or low on the output of the gates that will correspond to the numerous output signals. Additionally, there can be an array of logic gates for a combinational series of DTMF tones and respective output codes to be detected. This creates an infinite variety of ways for activating the seize relay 30.

Furthermore, FIG. 2 shows line 81 (wherein the DTMF tone is signaled) being connected to the "analog in" port 91. A five (5) volt power supply is connected to the "$V_{DD}$" port 92, the "enable" port 93, and the "crystal oscillator" port 94. A crystal is connected to the "clock out" port 95 and the "clock in" port 96. "Ground" is connected to port 97.

After the circuit 90 has processed the DTMF tone on line 81, a digital output is provided in a hexadecimal code corresponding to this detected tone. A table is provided below for identifying the output codes for the 16 DTMF tones (12 of the normal telephone keypad and 4 that are not available on the normal telephone keypad).

| Digit | Output Code | | | |
|---|---|---|---|---|
|  | D8 | D4 | D2 | D1 |
| 1 | 0 | 0 | 0 | 1 |
| 2 | 0 | 0 | 1 | 0 |
| 3 | 0 | 0 | 1 | 0 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |
| * | 1 | 0 | 1 | 1 |
| # | 1 | 1 | 0 | 0 |
| A | 1 | 1 | 0 | 1 |
| B | 1 | 1 | 1 | 0 |
| C | 1 | 1 | 1 | 1 |
| D | 0 | 0 | 0 | 0 |

Port "D1" 98, port "D2" 99, port "D4" 100, and port "D8" 101 all correspond to the digital output code table above. Port "DV" 102 goes high after a valid DTMF tone pair is sensed and decoded.

Therefore, if the predetermined signal (the unused DTMF tone "C"—852 Hertz and 1633 Hertz simultaneously) is detected, its corresponding hexadecimal output code 1111 is outputted on lines 98 through 101. Consequently, port "DV" is high (i.e. a binary "1"), port "D1" 98 is high into AND gate 110, which respectively outputs a high signal on line 120. With port "D2"

99 being high simultaneously with line 120 at AND gate 111, line 121 goes high. Port "D4" 100 is high with line 121 so that AND gate 112 goes high on 122. Port "D8" 101 is high along with line 122 to cause AND gate to go high on line 123. The five (5) volt power supply is also connected to AND gate 113 for energizing itself and transistor 115 connected on its output line 123.

With output line 123 going high, the base current from line 123 turns on transistor 115 so that collector current from the "output to local security system terminal" line 59 flows down through the transistor 115 and joins the base current therein. This combined current flows out of the emitter of the transistor 115 to ground. This "sinking" to ground can signal, for instance, the microprocessor in the local security system 50 to output a related signal on line 51. The seize relay 30 then switches from its first telephone line 31 to its second telephone line 32 so that communications can be established over the telephone line 20 between the central monitoring facility and the local security system terminal 50.

In the drawings and specification, there have been set forth preferred embodiments of the invention, and all those specific terms are employed, they are used in a generic and descriptive sense only and not for purposes of limitation, the scope of the invention being set forth in the following claims:

That which is claimed is:

1. A method for establishing telephone communications between a central security monitoring facility at a remote location and a local security system terminal without interference from a telephone answering machine connected to an incoming telephone line of a local telephone system, said method comprising: normally maintaining the incoming telephone line of the local telephone system connected to the telephone answering machine; placing a telephone call from the central security monitoring facility to the incoming telephone line of the local telephone system to generate a ringing signal; establishing an off-hook condition on the local telephone system by the telephone answering machine; transmitting from the central security monitoring facility to the incoming telephone line of the local telephone system a predetermined signal which is not produced by a normal DTMF telephone keypad and thus not normally available to a telephone user; monitoring the incoming telephone line for said predetermined signal, and in response to receipt of said predetermined signal, overriding and bypassing the telephone answering machine by disconnecting the telephone answering machine from the incoming telephone line and connecting said local security system terminal to the incoming telephone line to thereby establish telephone communications from the central security monitoring facility to the local security system terminal without interference presented by the connection of the telephone answering machine to the incoming telephone line.

2. The method according to claim 1 wherein said predetermined signal not normally available to the telephone user comprises at least one of the dual tone multi-frequency tones not available on a normal telephone keypad.

3. The method according to claim 2 wherein said dual tone multi-frequency tones not available on the normal telephone keypad comprise an "A" tone (simultaneous 697 hertz and 1633 hertz), "B" tone (simultaneous 770 hertz and 1633 hertz), "C" tone (simultaneous 852 hertz and 1633 hertz), and "D" tone (simultaneous 941 hertz and 1633 hertz).

4. A method for establishing telephone communications between a communications device at a remote location and a local communications terminal device without interference from a telephone answering machine connected to an incoming telephone line of a local telephone system, said method comprising: normally maintaining the incoming telephone line of the local telephone system connected to the telephone answering machine; placing a telephone call from the remote communications device to the incoming telephone line of the local telephone system to generate a ringing signal; establishing an off-hook condition on the local telephone system by the telephone answering machine; transmitting from the remote communications device to the incoming telephone line of the local telephone system a predetermined signal which comprises at least one of the dual tone multi-frequency tones not available on a normal DTMF telephone keypad and thus not normally available to a telephone user; monitoring the incoming telephone line of the local telephone system for said predetermined signal, and in response to receipt of said predetermined signal, overriding and bypassing the telephone answering machine by disconnecting the telephone answering machine from the incoming telephone line and connecting said local communications terminal device to the incoming telephone line to thereby establish telephone communications from the remote communications device to the local communications terminal device without interference presented by the connection of the telephone answering machine to the incoming telephone line.

5. The method according to claim 4 wherein said dual tone multi-frequency tones not available on the normal telephone keypad comprise an "A" tone (simultaneous 697 hertz and 1633 hertz), "B" tone (simultaneous 770 hertz and 1633 hertz), "C" tone (simultaneous 852 hertz and 1633 hertz), and "D" tone (simultaneous 941 hertz and 1633 hertz).

6. A telephone system comprising: an incoming telephone line; at least one telephone device adapted to communicate over said incoming telephone line; a telephone answering machine connected to said incoming telephone line and including means operable for answering a ringing signal on said incoming telephone line; a local communications terminal device adapted to communicate over said incoming telephone line with a communications device at a remote location; and a remote actuated command circuit for bypassing the telephone answering machine and seizing said incoming telephone line to permit establishing communications by the remote communications device over said incoming telephone line with said local communications terminal device without interference presented by the connection of said telephone answering machine to said incoming telephone line; said remote actuated command circuit comprising relay means connected to said incoming telephone line and switchable between a first position connecting said incoming telephone line to said at least one telephone device and to said telephone answering machine and a second position for seizing said incoming telephone line and connecting said local communications terminal device to said incoming telephone line while disconnecting said at least one telephone device and said answering machine from said incoming telephone line; said relay means being normally positioned in said first position for allowing conventional telephone communications to be had for said at least one telephone device and telephone answering machine over said incoming telephone line; said remote actuated command circuit further comprising means for monitoring said incoming telephone line for a predetermined signal comprising at least one of the dual tone multi-frequency tones not available on a normal DTMF telephone keypad and thus not normally available to a telephone user; said means for monitoring being connected to said incoming telephone line and to said relay means and being operable for switching said relay means from said first position to said second position in response to detection of said predetermined signal so that communications can be established over said incoming telephone line between the remote communications device and said local communications terminal device.

7. A telephone system according to claim 6 wherein said dual tone multi-frequency tones not available on the normal telephone keypad comprise an "A" tone (simultaneous 697 hertz and 1633 hertz), "B" tone (simultaneous 770 hertz and 1633 hertz), "C" tone (simultaneous 852 hertz and 1633 hertz), and "D" tone (simultaneous 941 hertz and 1633 hertz).

8. A telephone system according to claim 6 wherein said predetermined signal comprises at least one of the dual tone multi-frequency tones not available on the normal telephone keypad in series with at least one other tone.

9. A telephone system according to claim 8 wherein said at least one other tone comprises at least one of twelve dual tone multi-frequency tones present on the normal telephone keypad.

10. A telephone system according to claim 6 wherein said local communications terminal device is a local security system terminal adapted to communicate over said incoming telephone line with a central security monitoring facility at the remote location.

11. A telephone system comprising: an incoming telephone line; at least one telephone device adapted to communicate over said incoming telephone line; a telephone answering machine connected to said incoming telephone line and including means operable for answering a ringing signal on said incoming telephone line; a local security system terminal adapted to communicate over said incoming telephone line with a central security monitoring facility at a remote location; and a remote actuated command circuit for bypassing the telephone answering machine and seizing said incoming telephone line to permit establishing communications by the central security monitoring facility over said incoming telephone line with said local security system terminal without interference presented by the connection of said telephone answering machine to said incoming telephone line; said remote actuated command circuit comprising relay means connected to said incoming telephone line and switchable between a first position connecting said incoming telephone line to said at least one telephone device and to said telephone answering machine and a second position for seizing said incoming telephone line and connecting said local security system terminal to said incoming telephone line while disconnecting said at least one telephone device and said answering machine from said incoming telephone line; said relay means being normally positioned in said first position for allowing conventional telephone communications to be had for said at least one telephone device and telephone answering machine over said incoming telephone line; said remote actuated command circuit further comprising means for monitoring said incoming telephone line for a predetermined signal which is not produced by a normal DTMF telephone keypad and thus not normally available to a telephone user; said means for monitoring being connected to said incoming telephone line and to said relay means and being operable for switching said relay means from said first position to said second position in response to detection of said predetermined signal so that communications can be established over said incoming telephone line between the central security monitoring facility and said local security system terminal.

12. A telephone system according to claim 11 wherein said predetermined signal not normally available to the telephone user comprises at least one of the dual tone multi-frequency tones not available on a normal telephone keypad.

13. A telephone system according to claim 12 wherein said dual tone multi-frequency tones not available on the normal telephone keypad comprise an "A" tone (simultaneous 697 hertz and 1633 hertz), "B" tone (simultaneous 770 hertz and 1633 hertz), "C" tone (simultaneous 852 hertz and 1633 hertz), "D" tone (simultaneous 941 hertz and 1633 hertz).

14. A telephone system comprising: an incoming telephone line; at least one telephone device adapted to communicate over said incoming telephone line; a telephone answering machine connected to said incoming telephone line and including means operable for answering a ringing signal on said incoming telephone line; a local security system terminal adapted to communicate over said incoming telephone line with a central security monitoring facility at a remote location, and including answer means for answering a ringing signal on said incoming telephone line after a predetermined number of rings to permit the central security monitoring facility to establish communications with said local security system terminal over said incoming telephone line; and a remote actuated command circuit for bypassing the telephone answering machine and seizing said incoming telephone line to permit the central security monitoring facility to establish communications with said local security system terminal without interference presented by the connection of said telephone answering machine to said incoming telephone line; said remote actuated command circuit comprising relay means connected to said incoming telephone line and switchable between a first position connecting said incoming telephone line to said at least one telephone device and to said answering machine and a second position for seizing said incoming telephone line and connecting said local security system terminal to said incoming telephone line while disconnecting said at least one telephone device and said answering machine from said incoming telephone line; said relay means being normally positioned in said first position for allowing conventional telephone communications to be had for said at least one telephone device and telephone answering machine over said incoming telephone line; said remote actuated command circuit further comprising means for monitoring said incoming telephone line for a predetermined signal which is not produced by a normal DTMF telephone keypad and thus not normally available to a telephone user; said means for monitoring being connected to said incoming telephone line and to said relay means and being operable for switching said relay means from said first position to said second position in response to detection of said predetermined signal so that communications can be established over said incoming telephone line between the central security monitoring facility and said local security system terminal.

15. A telephone system according to claim 14 wherein said predetermined signal not normally available to the telephone user comprises at least one of the dual tone multi-frequency tones not available on a normal telephone keypad.

16. A telephone system according to claim 15 wherein said dual tone multi-frequency tones not available on the normal telephone keypad comprise an "A" tone (simultaneous 697 hertz and 1633 hertz), "B" tone (simultaneous 770 hertz and 1633 hertz), "C" tone (simultaneous 852 hertz and 1633 hertz), and "D" tone (simultaneous 941 hertz and 1633 hertz).

17. A remote actuated command circuit for use with terminating telephone equipment which includes at least one telephone device, a telephone answering machine, and a local security system terminal adapted to answer calls from and communicate with a central security monitoring facility over an incoming telephone line, said remote actuated command circuit serving for bypassing the telephone answering machine and seizing the incoming telephone line to permit the central security monitoring facility to establish communications with said local security system terminal without interference presented by the connection of the telephone answering machine to the incoming telephone line; and said remote actuated command circuit comprising relay means adapted to be connected to the incoming telephone line and switchable between a first position for connecting the incoming telephone line to the at least one telephone device and to the telephone answering machine and a second position for seizing the incoming telephone line and connecting said local security system terminal to the incoming telephone line while disconnecting the at least one telephone device and the answering machine from the incoming telephone line; said relay means being normally positioned in said first position for allowing conventional telephone communications to be had for the at least one telephone device and telephone answering machine over the incoming telephone line; said remote actuated command circuit further comprising means for monitoring the incoming telephone line for a predetermined signal which is not produced by a normal DTMF telephone keypad and thus not normally available to a telephone user; said means for monitoring being connected to the incoming telephone line and to said relay means and being operable for switching said relay means from said first position and to said second position in response to detection of said predetermined signal so that communications can be established over the incoming telephone line between the central security monitoring facility and said local security system terminal.

18. The remote actuated command circuit according to claim 17 wherein said predetermined signal not normally available to the telephone user comprises at least one of the dual tone multi-frequency tones not available on a normal telephone keypad.

19. The remote actuated command circuit according to claim 18 wherein said dual tone multi-frequency tones not available on the normal telephone keypad comprise an "A" tone (simultaneous 697 hertz and 1633 hertz), "B" tone (simultaneous 770 hertz and 1633 hertz), "C" tone (simultaneous 852 hertz and 1633 hertz), and "D" tone (simultaneous 941 hertz and 1633 hertz).

20. A remote actuated command circuit for use with terminating telephone equipment which includes at least one telephone device, a telephone answering machine, and a local communications terminal device adapted to answer calls from and communicate with a communications device at a remote location over an incoming telephone line, said remote actuated command circuit serving for bypassing the telephone answering machine and seizing the incoming telephone line to permit the remote communications device to establish communications with said local communications terminal device without interference presented by the connection of the telephone answering machine to the incoming telephone line; and said remote actuated command circuit comprising relay means adapted to be connected to the incoming telephone line and switchable between a first position for connecting the incoming telephone line to the at least one telephone device and to the telephone answering machine and a second position for seizing the incoming telephone line and connecting said local communicating terminal device to the incoming telephone line while disconnecting the at least one telephone device and the answering machine from the incoming telephone line; said relay means being normally positioned in said first position for allowing conventional telephone communications to be had for the at least one telephone device and telephone answering machine over the incoming telephone line; said remote actuated command circuit further comprising means for monitoring the incoming telephone line for a predetermined signal comprising at least one of the dual tone multi-frequency tones not available on a normal DTMF telephone keypad and thus not normally available to a telephone user; said means for monitoring being connected to the incoming telephone line and to said relay means and being operable for switching said relay means from said first position to said second position in response to detection of said predetermined signal so that communications can be established over the incoming telephone line between the remote communications device and said local communication terminal device.

21. The remote actuated command circuit according to claim 20 wherein said dual tone multi-frequency tones not available on the normal telephone keypad comprise an "A" tone (simultaneous 697 hertz and 1633 hertz), "B" tone (simultaneous 770 hertz and 1633 hertz), "C" tone (simultaneous 852 hertz and 1633 hertz), and "D" tone (simultaneous 941 hertz and 1633 hertz).

22. A telephone system comprising: an incoming telephone line; at least one telephone device adapted to communicate over said incoming telephone line; a telephone answering machine connected to said incoming telephone line and including means operable for answering a ringing signal on said incoming telephone line; a local security system terminal adapted to communicate over said incoming telephone line with a central security monitoring facility at a remote location, and including dial out means for establishing communications via said incoming telephone line to the central security monitoring facility; and a remote actuated command circuit for bypassing the telephone answering machine and seizing said incoming telephone line to permit establishing communications by the central security monitoring facility over said incoming telephone line with said local security system terminal without interference presented by the connection of said telephone answering machine to said incoming telephone line; said remote actuated command circuit comprising relay means connected to said incoming telephone line and switchable between a first position connecting said incoming telephone line to said at least one telephone device and to said telephone answering machine and a second position for seizing said incoming telephone line and connecting said local security system terminal to said incoming telephone line while disconnecting said at least one telephone device and said answering machine from said incoming telephone line; said relay means being normally positioned in said first position for allowing conventional telephone communications to be had for said at least one telephone device and telephone answering machine over said incoming telephone line; said remote actuated command circuit further comprising means for monitoring said incoming telephone line for a predetermined signal which is not produced by a normal DTMF telephone keypad and thus not normally available to a telephone user; said means for monitoring being connected to said incoming telephone line and to said relay means and being operable for switching said relay means from said first position to said second position in response to detection of said predetermined signal so that communications can be established over said incoming telephone line between the central security monitoring facility and said local security system terminal.

23. A telephone system according to claim 22 wherein said predetermined signal not normally available to the telephone user comprises at least one of the dual tone multi-frequency tones not available on a normal telephone keypad.

24. A telephone system comprising: an incoming telephone line; at least one telephone device adapted to communicate over said incoming telephone line; a telephone answering machine connected to said incoming telephone line and including means operable for answering a ringing signal on said incoming telephone line; a local security system terminal adapted to communicate over said incoming telephone line with a central security monitoring facility at a remote location, and including answer means for answering a ringing signal on said incoming telephone line after a predetermined number of rings to permit the central security monitoring facility to establish communications with said local security system terminal over said incoming telephone line, and further including dial out means for establishing communications via said incoming telephone line to the central security monitoring facility; and a remote actuated command circuit for bypassing the telephone answering machine and seizing said incoming telephone line to permit the central security monitoring facility to establish communications with said local security system terminal without interference presented by the connection of said telephone answering machine to said incoming telephone line; said remote actuated command circuit comprising relay means connected to said incoming telephone line and switchable between a first position connecting said incoming telephone line to said at least one telephone device and to said telephone answering machine and a second position for seizing said incoming telephone line and connecting said local security system terminal to said incoming telephone line while disconnecting said at least one telephone device and said answering machine from said incoming telephone line; said relay means being normally positioned in said first position for allowing conventional telephone communications to be had for said at least one telephone device and telephone answering machine over said incoming telephone line; said remote actuated command circuit further comprising means for monitoring said incoming telephone line for a predetermined signal which is not produced by a normal DTMF telephone keypad and thus not normally available to a telephone user; said means for monitoring being connected to said incoming telephone line and to said relay means and being operable for switching said relay means from said first position to said second position in response to detection of said predetermined signal so that communications can be established over said incoming telephone line between the central security monitoring facility and said local security system terminal.

25. A telephone system according to claim 24 wherein said predetermined signal not normally available to the telephone user comprises at least one of the dual tone multi-frequency tones not available on a normal telephone keypad.

* * * * *

UNITED STATES PATENT AND TRADEMARK OFFICE
CERTIFICATE OF CORRECTION

PATENT NO. : 4,949,372

DATED : August 14, 1990

INVENTOR(S) : David C. Steele

It is certified that error appears in the above-identified patent and that said Letters Patent is hereby corrected as shown below:

Column 4, line 66, "3" should be -- 30 --.

Column 7, line 10, after "if" insert -- the --.

Column 7, line 12, after "facility" insert -- and --.

Column 7, line 14, after "specific" insert -- embodiment, --.

Column 7, line 15, "un tones," should be -- unused DTMF tones, --.

Column 7, line 16, after "can" insert -- determine how --.

Column 7, line 17, after "is" insert -- known --.

Column 7, line 18, after "as" insert -- AND, NAND, --.

Column 7, line 19, after "signalling" insert -- the --.

Column 7, line 66, after "DV" insert -- 102 --.

Column 11, line 24, after "hertz)," insert -- and --.

UNITED STATES PATENT AND TRADEMARK OFFICE
CERTIFICATE OF CORRECTION

PATENT NO. : 4,949,372

DATED : August 14, 1990

INVENTOR(S) : David C. Steele

It is certified that error appears in the above-identified patent and that said Letters Patent is hereby corrected as shown below:

Column 12, line 53, after "tion" delete -- and --.

Signed and Sealed this

Thirty-first Day of March, 1992

Attest:

HARRY F. MANBECK, JR.

*Attesting Officer*   *Commissioner of Patents and Trademarks*